(12) United States Patent  (10) Patent No.: US 8,752,743 B2
Nazarenko et al.  (45) Date of Patent: Jun. 17, 2014

(54) ARTICLE CARRIER FOR SUPPORTING MULTIPLE ARTICLES AROUND A NECK OF A WEARER

(75) Inventors: Victoria Nazarenko, Old Bridge, NJ (US); Anastasia Nazarenko, Old Bridge, NJ (US)

(73) Assignee: Trineitte & Co., Old Bridge, NJ (US)

( * ) Notice: Subject to any disclaimer, the term of this patent is extended or adjusted under 35 U.S.C. 154(b) by 332 days.

(21) Appl. No.: 13/184,514

(22) Filed: Jul. 16, 2011

(65) Prior Publication Data

US 2012/0037672 A1    Feb. 16, 2012

Related U.S. Application Data

(60) Provisional application No. 61/372,142, filed on Aug. 10, 2010.

(51) Int. Cl.
*A45F 5/00* (2006.01)

(52) U.S. Cl.
USPC .......................................... 224/257; 224/101

(58) Field of Classification Search
USPC .................... 224/257, 101; D3/327
See application file for complete search history.

(56) References Cited

U.S. PATENT DOCUMENTS

| | | | |
|---|---|---|---|
| 2,284,069 A | 2/1939 | Robertson | |
| 2,297,661 A | 5/1939 | Okun | |
| 2,665,042 A | 10/1951 | Starolis | |
| D166,677 S | 1/1952 | Katz | |
| D240,759 S | 7/1976 | Kliener | |
| D246,704 S | 12/1977 | Ophir | |
| D252,744 S | 8/1979 | Barr | |
| D252,865 S | 9/1979 | Barr | |
| D255,669 S | 7/1980 | Trupiano | |
| 4,229,018 A * | 10/1980 | Chika | 280/203 |
| D260,140 S | 8/1981 | Bicenko | |
| D263,571 S | 3/1982 | Beier | |
| D264,272 S | 5/1982 | Brinley | |
| D266,555 S | 10/1982 | McNally | |
| D272,609 S | 2/1984 | Ofiesh, II | |

(Continued)

FOREIGN PATENT DOCUMENTS

| | | |
|---|---|---|
| CA | 2465050 A1 | 10/2005 |
| EP | 2417869 A1 | 2/2012 |

OTHER PUBLICATIONS

European Patent Office, Extended Search Report of European Patent Application No. 11176356, cf form 1507 sheets, 1-3, Aug. 2011.

(Continued)

*Primary Examiner* — Brian D Nash
(74) *Attorney, Agent, or Firm* — Franklin & Associates International; Matthew F. Lambrinos

(57) ABSTRACT

An article carrier has a first member including a top side and a first arch. The first arch optionally is for receiving a first article. The article carrier also has a moveable second member connected to the first member. The second member is moveable from a first position connected to a lateral side of the first member and to a second position where the moveable second member is not connected to the lateral side. The moveable second member may retain a second article on the moveable second member in the second position. The second member may capture a temple bar of a pair of glasses on the second member.

21 Claims, 6 Drawing Sheets

(56) References Cited

U.S. PATENT DOCUMENTS

| | | | |
|---|---|---|---|
| 4,458,384 A | 7/1984 | Arnold | |
| 4,516,708 A | 5/1985 | Elliott | |
| 4,674,298 A | 6/1987 | Wimmershoff-Caplan | |
| 4,771,515 A | 9/1988 | Guarro | |
| D301,845 S | 6/1989 | Yoshida | |
| 4,894,887 A | 1/1990 | Ward | |
| 5,005,263 A | 4/1991 | Barrett | |
| 5,027,477 A | 7/1991 | Seron | |
| 5,033,612 A | 7/1991 | Bivins | |
| D321,199 S | 10/1991 | Souisa | |
| 5,092,018 A * | 3/1992 | Seron | 24/3.4 |
| D328,085 S | 7/1992 | Rickabus | |
| D329,246 S | 9/1992 | Eppenhauer | |
| D345,097 S | 3/1994 | Triangolo | |
| 5,305,934 A | 4/1994 | Grey | |
| 5,319,838 A | 6/1994 | Eppenauer | |
| 5,385,282 A | 1/1995 | Chen | |
| 5,407,244 A * | 4/1995 | Nakano et al. | 296/68.1 |
| 5,465,466 A | 11/1995 | Napier | |
| 5,551,126 A | 9/1996 | Wallo | |
| D378,023 S | 2/1997 | Grassey | |
| 5,600,873 A * | 2/1997 | May | 24/3.2 |
| 5,680,679 A * | 10/1997 | May | 24/3.2 |
| 5,699,140 A | 12/1997 | Fuhrman | |
| 5,713,821 A * | 2/1998 | Nissen | 482/114 |
| D396,199 S | 7/1998 | Chang | |
| D397,307 S | 8/1998 | Shenhav | |
| 5,860,191 A | 1/1999 | Sieger | |
| 5,893,198 A | 4/1999 | DeCotis | |
| 5,956,812 A | 9/1999 | Moennig | |
| D423,986 S | 5/2000 | Ishii et al. | |
| 6,076,925 A | 6/2000 | Kraut | |
| D429,474 S | 8/2000 | Stein | |
| 6,216,319 B1 * | 4/2001 | Elkins | 24/3.2 |
| D444,093 S | 6/2001 | Glesser | |
| 6,260,749 B1 | 7/2001 | Horovitz | |
| 6,263,546 B1 | 7/2001 | Baldwin | |
| 6,381,985 B1 | 5/2002 | Burgard | |
| D459,266 S | 6/2002 | Rizetto | |
| D466,827 S | 12/2002 | Fornas | |
| D467,829 S | 12/2002 | Novak | |
| D470,075 S | 2/2003 | Carmel | |
| D470,307 S | 2/2003 | McCormack | |
| 6,533,414 B2 | 3/2003 | Newler | |
| 6,539,587 B2 | 4/2003 | Harrison | |
| 6,540,293 B1 * | 4/2003 | Quackenbush | 297/256.13 |
| D478,836 S | 8/2003 | McCormack | |
| D484,067 S | 12/2003 | Wright | |
| 6,688,507 B2 | 2/2004 | McCormack | |
| D499,351 S | 12/2004 | Hardy | |
| 6,851,591 B2 | 2/2005 | Wissman | |
| D517,939 S | 3/2006 | Zoullas | |
| 7,188,493 B2 | 3/2007 | Conway | |
| D543,130 S | 5/2007 | Allin | |
| D547,693 S | 7/2007 | Toupet | |
| D555,533 S | 11/2007 | Gruosi-Scheufele | |
| 7,316,130 B2 | 1/2008 | Morkenborg | |
| 7,530,411 B2 * | 5/2009 | Huntsberger et al. | 180/65.1 |
| D596,980 S | 7/2009 | Aletto | |
| D600,587 S | 9/2009 | Urquico | |
| 7,584,527 B2 | 9/2009 | Jones | |
| D606,445 S | 12/2009 | Hobbs | |
| D606,446 S | 12/2009 | Aletto | |
| D606,450 S | 12/2009 | Aletto | |
| 2002/0010983 A1 | 1/2002 | Lee | |
| 2003/0014845 A1 | 1/2003 | Harrison | |
| 2003/0160076 A1 * | 8/2003 | Lofaro | 224/275 |
| 2004/0025804 A1 * | 2/2004 | Smith et al. | 119/792 |
| 2005/0041201 A1 | 2/2005 | Shapiro | |
| 2005/0242137 A1 * | 11/2005 | Fishman et al. | 224/221 |
| 2006/0185393 A1 | 8/2006 | Cherry | |
| 2007/0294863 A1 | 12/2007 | Johnson | |
| 2012/0168471 A1 * | 7/2012 | Wilson | 224/152 |

OTHER PUBLICATIONS

Representative for Victoria Nazarenko, Reply filed Jul. 16, 2012 at European Patent Office and responding to Extended Search Report of European Patent Application No. 11176356, pp. 1-2, Our ref: P001734EP00, European Patent Office.

* cited by examiner

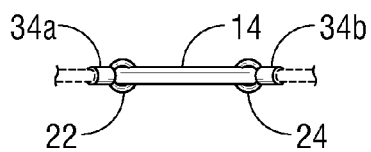
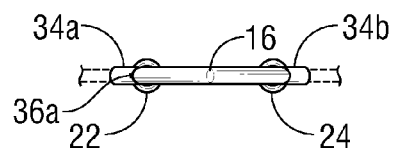
FIG. 4A    FIG. 4B
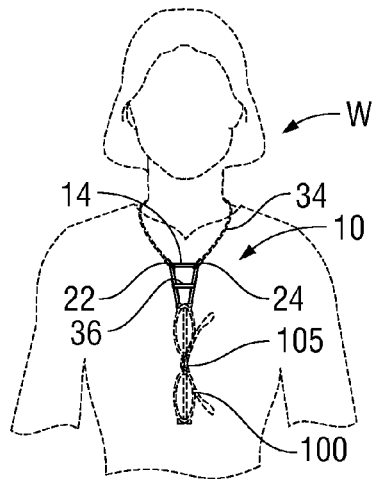
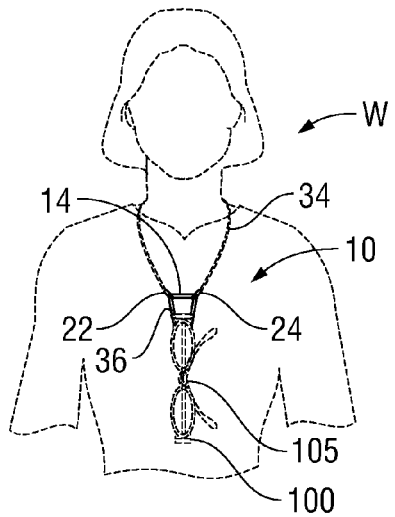
FIG. 5    FIG. 6
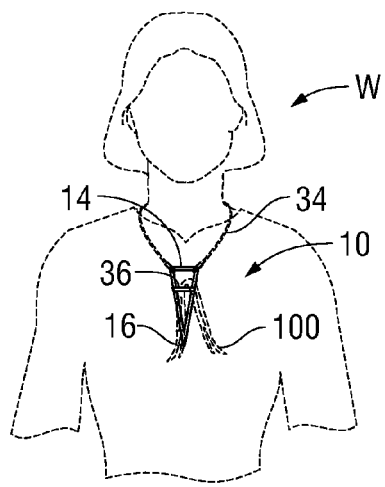
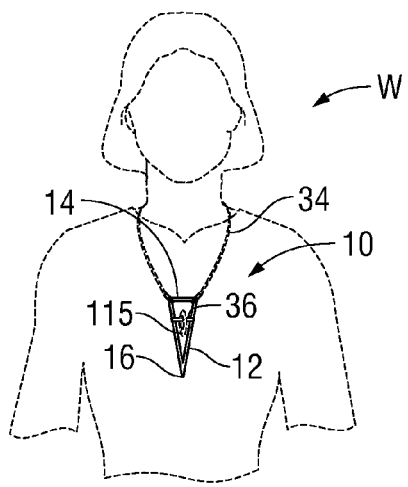
FIG. 7    FIG. 8

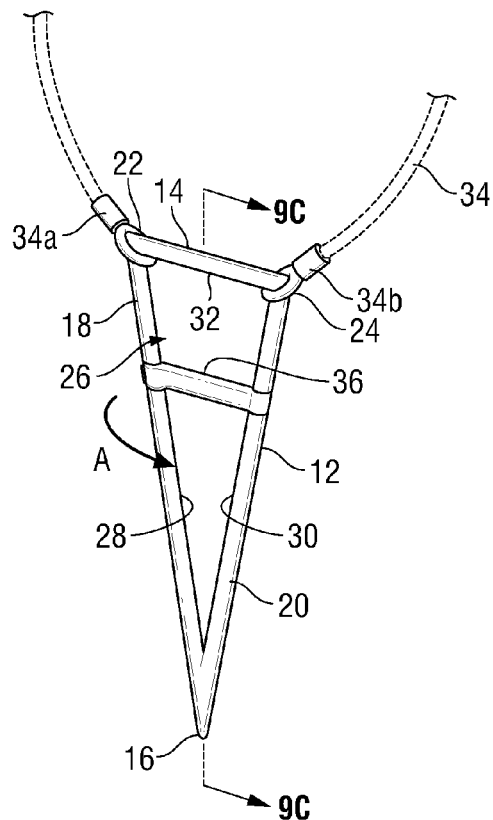
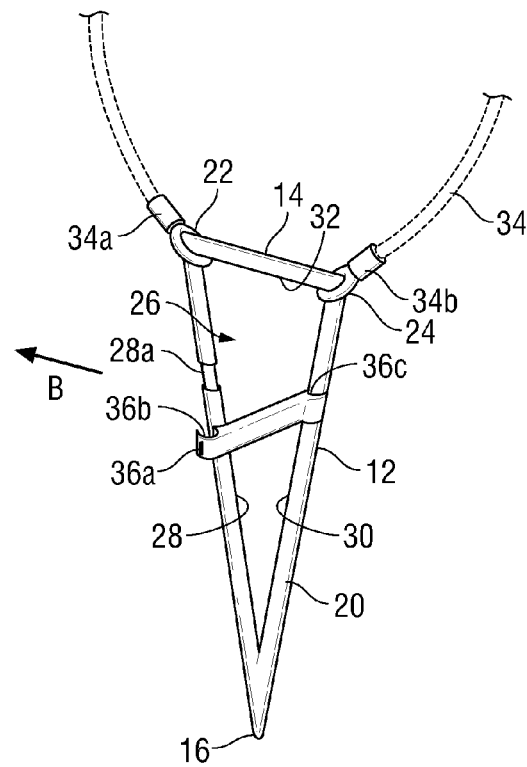
FIG. 9A
FIG. 9B
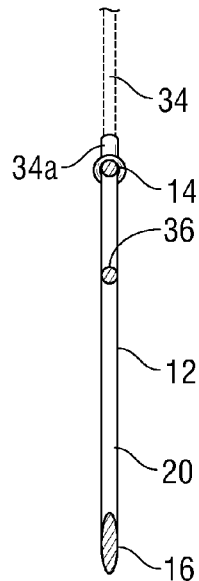
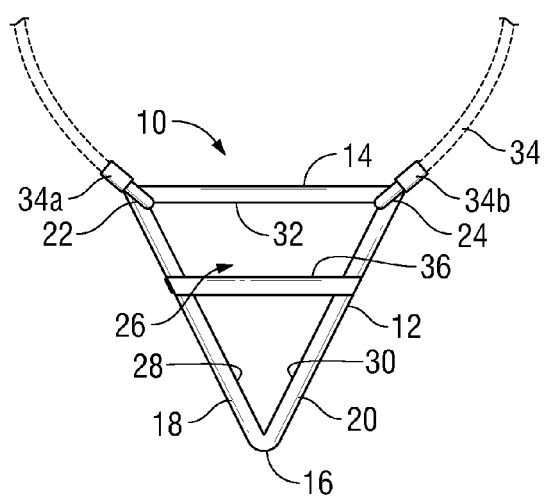
FIG. 9C
FIG. 10A

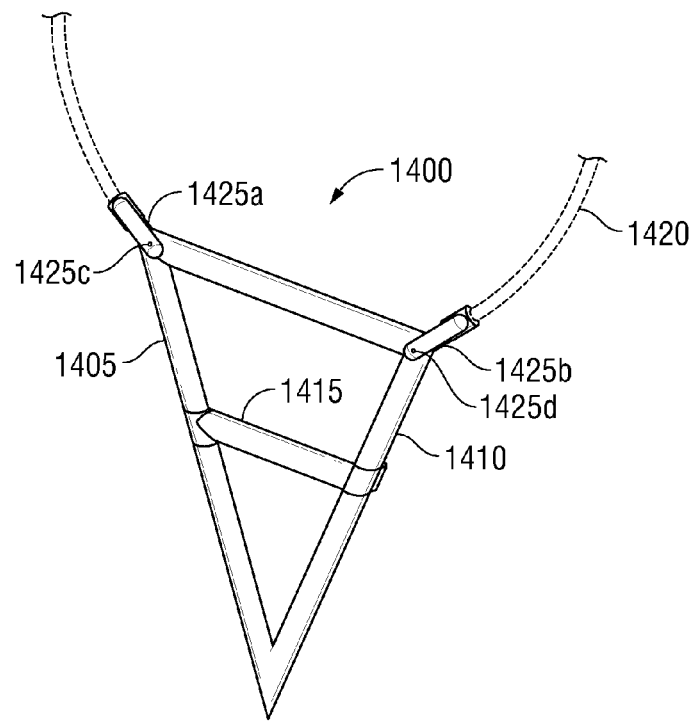
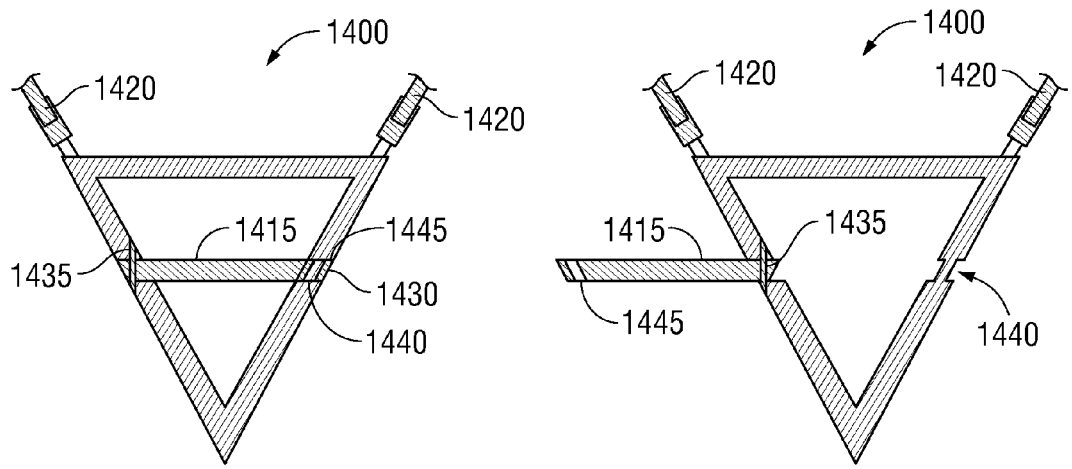
FIG. 14A
FIG. 14B
FIG. 14C

ARTICLE CARRIER FOR SUPPORTING MULTIPLE ARTICLES AROUND A NECK OF A WEARER

CROSS REFERENCE TO RELATED PATENT APPLICATIONS

This patent application claims priority to U.S. Provisional Patent Application Ser. No. 61/372,142 to Nazarenko et al., and has a filing date of Aug. 10, 2010, which is herein incorporated by reference.

FIELD OF THE INVENTION

The present disclosure is directed to an article carrier that can be worn around the neck of a wearer that can stow a number of different articles in a simultaneous fashion.

BACKGROUND OF THE RELATED ART

Neck mounted eyeglass holders are known in the art. U.S. Pat. No. 6,539,587 to Harrison, which is herein incorporated by reference in its entirety, discloses a necklace mounted eyeglass holder. The eyeglass holder includes an arching or curving body. The arching or curved body extends and assists with supporting the member on the body. An interior of the triangular shaped member is hollow and is connected at a single point at a top side of the member to the chain. The chain surrounds the neck of the user. However, Harrison is deficient in that it can only support a single article.

Generally, a person may need to wear several articles during the day. He or she may need to use them one at a time or all at once. It is not convenient for a user to reach for an eyeglass case to take the eyewear out and put back in every time it is needed. The user might need to keep the eyewear at hand at all times.

Also, sometimes a user may remove a scarf. The user may place the scarf in a handbag or the like or keep it in hand at all times. Alternatively, the user may wrap the scarf around the handbag or handle for storage. This is not the best way to treat an expensive scarf.

Also, there is a great risk with all wearers of jewelry of loss of earrings, rings, and other small, but very costly pieces of jewelry. When cooking, or washing one's hands, a wearer will remove the jewelry not wishing to soil or lose the jewelry. As time passes, the wearer may forget to put the jewelry back on and may lose the jewelry. Some pieces of jewelry may be very expensive depending on the type of precious metal, a gemstone mounted in the jewelry, and the weight of the jewelry. Additionally, the jewelry may not only be costly, but may also have sentimental value from a wedding, a graduation, or a gift.

SUMMARY OF THE INVENTION

There is a need in the art for a first jewelry device to removably store other second jewelry to prevent loss of the second jewelry.

There is a need in the art for jewelry that may carry several different articles at once in an easy manner.

There is a need in the art for jewelry device that may pin an article against at least two interior walls of the jewelry device to store the article and to prevent the loss of the article.

There is a need in the art for jewelry device that may carry at least two of (i) a ring, (ii) a pair of sunglasses, (iii) a scarf, (iv) an earring, (v) a pair of reading glasses at once in an easy manner.

There is a need in the art for jewelry that has a horizontal bar that can move from between a first position and a second position with the horizontal bar that can capture and carry an article in an easy manner.

There is a need in the art for jewelry that has a horizontal bar that can move in a horizontal manner from between a first position and a second position to capture and carry an article in an easy manner.

There is a need in the art for jewelry that has a horizontal bar that can swivel from between a first position and a second position to capture and carry an article in an easy manner.

In an effort to meet these needs, the present inventor has provided for a carrier that can carry several articles one at a time or all at once that are securely retained in a carrier as a person moves around or bends over.

According to a first aspect of the present disclosure, there is provided an article carrier. The article carrier comprises a first member including a top side and a first arch. The first arch is for optionally receiving a first article. A moveable second member is connected to the first member and is moveable from a first position connected to a lateral side of the first member to a second position where the moveable second member is not connected to the lateral side. The moveable second member optionally retains a second article on the moveable second member in the second position. The moveable second member may also secure a pair of glasses with a wide temple bar thereon.

In yet another aspect, the second member was designed to not only hold the second article, but to hold a pair of glasses with a wide temple bar on the top of the second member. Therefore, the first arch is provided for a narrow temple bar glasses, while the top of the second member is used for the wide temple bar glasses.

In yet another aspect of the present disclosure there is provided a method of supporting multiple articles around a pendant supported by the neck of a wearer. The method comprises providing a first member including a top side and a first arch. The first arch is for optionally receiving a first article. The method also includes providing a moveable second member, which is transverse to the first member and that is removably connected to the first member. The second member is moved from a first position connected to a lateral side of the first member to a second position where the moveable second member is not connected to the lateral side to optionally retain a second article on the moveable second member in the second position. In another embodiment, the second member may capture a temple bar of a pair of glasses thereon.

In another embodiment of the present disclosure, there is provided an article carrier for supporting multiple articles around the neck of a wearer. The article carrier comprises a first member including a top side and a first arch. The first member comprises a generally shaped isosceles triangular shaped member with a hollowed out interior space. The first arch is for optionally receiving a first article. The article carrier also has a moveable horizontally disposed second member. The second member is connected to the first member, and moveable from a first position connected to a lateral side of the first member and to a second position where the moveable second member is not connected to the lateral side.

The moveable second member optionally retains a second article on the moveable second member in the second position retained between at least two interior lateral sides of the first member. The first article is a pair of glasses, and the second article is selected from jewelry or a scarf. A third member is also provided for surrounding a neck of the wearer and is connected to and supports the first member.

In another embodiment, the article carrier may comprise a bracelet or an anklet.

BRIEF DESCRIPTION OF THE FIGURES

The foregoing and other objects, features and advantages of the invention will be apparent from the following more particular description of preferred embodiments of the invention, as illustrated in the accompanying drawings in which like reference characters refer to the same parts throughout different views. The drawings are not meant to limit the invention to particular mechanisms for carrying out the invention in practice, but rather, the drawings are illustrative of certain ways of performing the invention. Others will be readily apparent to those skilled in the art.

FIG. 4A and FIG. 4B show a top and a bottom view of the article carrier;

FIG. 5 shows a front view of the article carrier being worn around the neck of the wearer for stowing a pair of glasses on a first arch;

FIG. 6 shows a front view of the article carrier being worn around the neck of the wearer for stowing a pair of glasses above the first arch on an intermediate member;

FIG. 7 shows a front view of the article carrier being worn around the neck of the wearer for stowing a scarf above the first arch on an intermediate member;

FIG. 8 shows a front view of the article carrier being worn around the neck of the wearer for stowing a ring above the first arch on an intermediate member;

FIG. 9A shows a perspective view of the article carrier with the intermediate member in a closed configuration;

FIG. 9B shows a perspective view of the article carrier having the intermediate bar moved from the closed configuration shown in FIG. 9A to an open configuration to load and store a ring and/or a scarf on the intermediate bar;

FIG. 9C shows a cross sectional view of the article carrier;

FIG. 10A shows another alternative embodiment of the present disclosure with the article carrier rendered as an equilateral triangle;

FIG. 14A-14C illustrate an alternative embodiment of the article carrier rendered as an equilateral triangle illustrating an intermediate bar, a hinge and a connector potion between the article carrier and the chain and illustrating a hinge that permits the intermediate bar to rotate 360 degrees.

DETAILED DESCRIPTION OF THE PREFERRED EMBODIMENTS

Figure 1:
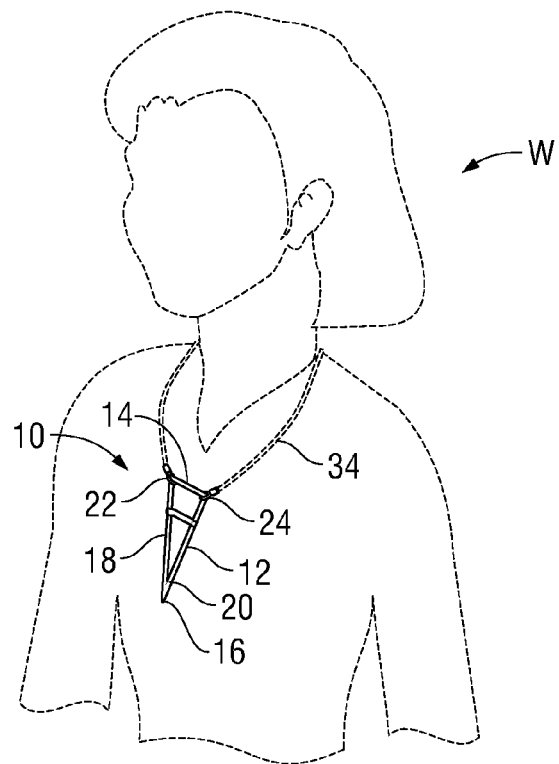
FIG. 1 shows an article carrier in a perspective view around the neck of a wearer.

The present disclosure preferably is directed to an article carrier 10 that is preferably worn around the neck of a wearer or that is clipped onto a wearer's garment as discussed herein. The article carrier 10 shown in FIG. 1 preferably includes a body 12, which is generally an isosceles triangular shaped member that is inverted and that includes a top side 14 and a bottom or inverted apex member 16. The article carrier 10 in one preferred embodiment can be an isosceles triangular shaped member with two sides 18 and 20 that are equal in length and that also has two angles of the same measure namely, the angles opposite to the two sides 18 and 20 of the same length.

Figure 2:
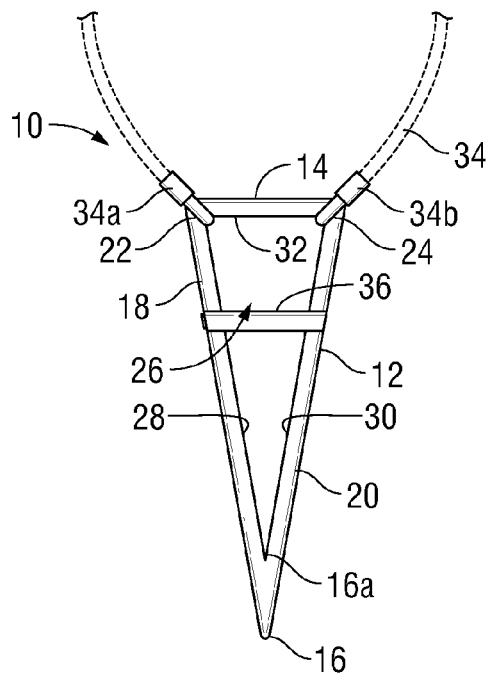
FIG. 2 shows a front view of the article carrier of FIG. 1.
Figure 3:
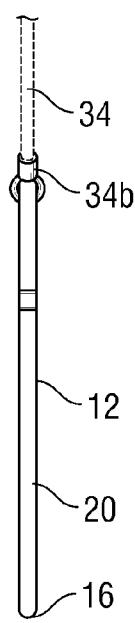
FIG. 3 shows a side view of the article carrier of FIG. 1.

Turning now to FIG. 2, there is shown a front view of the article carrier 10. It should be appreciated that the body 12 need not be an isosceles triangular shaped member 12 but instead may be an equilateral shaped triangular member or a scalene shaped triangular member or have a different shape. In yet another embodiment, the body 12 need not be triangular shaped but can be alternatively, rectangular shaped, square shaped, circular shaped, oval, elliptical, rectangular shaped, square, or any polygonal shaped body 12 known in the art. In another embodiment, the body 12 may have an irregular shape or may simply be incorporated into an aesthetically pleasing configuration. Preferably and in all embodiments, the body 12 is straight and flat and includes no curvature whatsoever from the top side 14 to the bottom apex member 16. Also, bottom apex 16 and edges 22 and 24 are smooth and rounded so as to be capable of being worn around the neck of a wearer as shown in FIG. 1.

The article carrier 10 shown in FIG. 2 preferably is formed with at least one precious metal, such as gold, silver, brass, platinum, palladium, or a precious alloy suitable for jewelry. The article carrier 10 shown in FIG. 2 may further include one or more precious articles disposed therein, for example, a piece of gold, a precious diamond, a precious coating of a material, an enamel, or an engraving thereon. In another embodiment, the carrier 10 may have a gemstone or a combination of gemstones. Various decorative effects are possible and within the scope of the present disclosure. The body 12 includes lateral sides 18 and 20 that intersect with the top side 14 at the corners 22 and 24. The lateral sides 18 and 20 converge at the bottom apex member 16.

Figure 4:
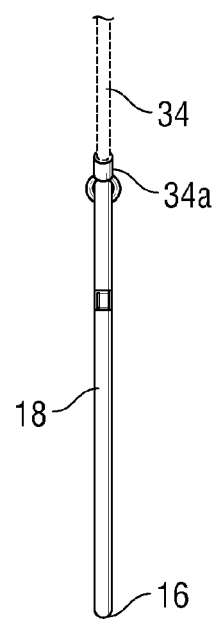
FIG. 4 shows an opposite side view of the article carrier of FIG. 3.

Preferably an interior space 26 of the body 12 is hollowed out and forms a negative space therein with an interior wall 28, and interior wall 30 and a third interior wall 32. Body 12 preferably is connected to a member that surrounds a neck of the wearer or a chain, necklace 34 or the like. Necklace 34 may be rope, leather, a string, a string of stones, a string of gemstones, or can be made from a precious metal, such as, for example gold, silver, platinum, or a precious alloy. Less preferably, the necklace 34 may be made from a string or any other deformable encircling material known in the art. Body 12 is preferably connected to a first and a second clip member 34a and 34b. The first and the second clip member 34a and 34b surround the body 12 at the first and the second edges 22 and 24 to connect the chain or necklace 34 to the body 12. In another embodiment of the present disclosure, the clip members 34a and 34b may be omitted and the body 12 may include a pin (not shown) to clip to a garment. The present disclosure is not limited to a chain or necklace 34 suspended configuration and may be supported in a number of different manners. FIGS. 4A and 4B show a top and a bottom view of the body 12.

Disposed about midway between the top side 14 and the bottom apex 16 is an intermediate member 36 that is horizontally disposed and generally parallel with the top side 14. The intermediate member 36 is preferably a resilient member that is made from the same or different material than the body 12. The intermediate member 36 preferably allows for removable storage of an item within the interior space 26 of the article carrier 10 with the item secured by the intermediate member 36 and the lateral interior side walls 28 and 30.

Turning now to FIG. 5 there is shown the article carrier 10 disposed around the neck of the wearer. As can be seen the article carrier 10 includes a first top side 14, and an arch 16 that is opposite the top side 14. The article carrier also includes members 18 and 20 that commence at the edges 22 and 24 and converge at the apex member 16 to form the isosceles triangular shaped body 12. As can be seen a pair of glasses 100 (sunglasses or reading glasses 100 having a temple bar 105) is inserted through interior space 26 and below the intermediate member 36 and is removably supported by bottom apex or arch 16.

Turning now to FIG. 6 there is shown the article carrier 10 disposed around the neck of the wearer. As can be seen the article carrier 10 includes a first top side 14, and an arch 16 that is opposite the top side 14. The article carrier also includes members 18 and 20 that commence at the edges 22 and 24 and converge at the apex member 16 to form the isosceles triangular shaped body 12. As can be seen a pair of glasses 100 (sunglasses or reading glasses 100 having a temple bar 105) is inserted through interior space 26 and is disposed on the intermediate member 36 and is removably supported by the intermediate bar member 36 for storage while the user's hands are free.

Turning now to FIG. 7 there is shown the article carrier 10 disposed around the neck of the wearer. As can be seen again the article carrier 10 includes a first top side 14, and an arch 16 that is opposite the top side 14. The article carrier also includes members 18 and 20 that commence at the edges 22 and 24 and converge at the apex member 16 to form the isosceles triangular shaped body 12. As can be seen a scarf generally shown as an object 100 in FIG. 7 is inserted through interior space 26 and is disposed wrapped around the intermediate member 36 and is removably supported by the intermediate bar member 36 for storage while the user's hands are free.

Turning now to FIG. 8 there is shown the article carrier 10 disposed around the neck of the wearer. As can be seen again the article carrier 10 includes a first top side 14, and an arch 16 that is opposite the top side 14. The article carrier 10 also includes members 18 and 20 that commence at the edges 22 and 24 and converge at the apex member 16 to form the isosceles triangular shaped body 12. As can be seen a ring 115 is inserted through interior space 26 and is disposed wrapped around the intermediate member 36 and is removably supported by the intermediate bar member 36 for storage while the user's hands are free. In this aspect, the intermediate member 36 may be moveable from between at least two positions to lock the ring 115 in place.

Preferably, and as shown by FIGS. 9A and 9B the intermediate member 36 is movable from between two configurations, or a first closed configuration and a second open configuration to stow an article therein. One configuration is designated as closed or where the intermediate member 36 contacts both the interior wall 28 and interior wall 30. Another configuration is designated as open or where at least one side of the intermediate member 36 does not contact the interior wall 28 or the interior wall 30 and the opposite side of the intermediate member 36 does contact the wall 28 and 30. Various configurations are possible and within the scope of the present disclosure. In one aspect, the member 36 may open from the wall 28. In another aspect, the member 36 may open from the opposite wall 30. In a further alternative embodiment, the member 36 may be connected to both walls and open in the middle portion of the member 46.

Preferably, a user can grasp the intermediate member 36 and the body 12 and move the intermediate member 36 relative to the body 12 where the intermediate member 36 is separated from contact with the interior wall 28 and member 18 to expose a tip 36a of the intermediate member 36. In this manner, the user can load a piece of jewelry 115 (FIG. 8), such as, for example, a ring 115, earring (not shown) or the like and/or a scarf 100 (FIG. 7) on the intermediate member 36. In another embodiment, the intermediate member 36 may store both a scarf 100 and a ring 115. This is accomplished by taking the open center of the ring 115 and moving the ring 115 to straddle the intermediate member 36 and/or placing the scarf 100 into the opening of the body 12. Preferably, the scarf 100 is placed into the opening of the body. Thereafter, and once loaded with the ring 115 and/or the scarf 100, the intermediate member 36 may be moved to contact with the interior wall 28 and member 18 to stow the ring 115 and/or the scarf 100 on the intermediate member 36 as shown in FIGS. 9A and 9B. In one embodiment, the intermediate member 36 may lock with the wall 28. In this aspect, the intermediate bar 36 includes a forked portion 36a with an interior space 36b that engages with a reduced cross section 28a of the member 18 to lock the intermediate member 36 with the member 18. In another alternative embodiment, the intermediate member 36 may be biased by a spring (not shown) to engage with the wall 28. Various configurations are possible and within the scope of the present disclosure.

The intermediate member 36 may be movable from the opened to the closed position in a number of different ways. In one embodiment of the present disclosure, the opposite side 36c of the intermediate member 36 relative to the tip 36a may include a pivot or the like to assist with pivoting the intermediate member 36 in the direction of reference arrow A (FIG. 9A) to move the intermediate member 36 relative to the body 12 from the first position to the second position.

In another alternative embodiment of the present disclosure, the intermediate member 36 may move in a horizontal sliding manner in the direction of reference arrow B to move the intermediate member 36 apart from the interior wall 30 in the direction toward the interior wall 28 from the first position to the second position. In a further embodiment of the present disclosure, the entire intermediate member 36 may be separated completely from the body 12 from the interior wall 30 and interior wall 28 to load the article on the intermediate member 36 and then the intermediate member 36 is replaced to the body 12. Preferably, the intermediate member 36 may engage with a complementary notch portion 28a that is disposed on the member 18 for locking the intermediate bar 36 forked portion 36a and notch 36b with the member 18 and the body 12. In a further embodiment of the present disclosure, the intermediate member 36 may be fixedly attached to the interior walls 28 and 30 and another centermost portion of the intermediate member 36 may be opened and closed to load the article on the intermediate member 36. Various configurations are possible and within the scope of the present disclosure. Clasp 36 can be made in a shape of any figurative design (the clasp can be not just straight, but any other figurative shape) that can be a snake, a panther, a dragon, etc. made out of any precious metal or gemstones or a combination of them. FIG. 9C shows a cross sectional view of the instant article carrier 10 showing the intermediate member 36 being connected to the walls 28 and 30 and illustrating the pivoting mechanism and clasp.

Turning now again to FIGS. 5-8 there is shown the article carrier 10 disposed around the neck of the wearer W. Preferably, a pair of eyeglasses 100, a pair of sunglasses 100, a scarf generally shown as an object 100 and a ring 115 can be stowed in the article carrier 10 simultaneously. Preferably, the pair of eyeglasses 100 includes a temple bar 105. The pair of sunglasses 100 also includes a temple bar 105. Temple bar 105 preferably is disposed on the bottom apex 16 and secured into the interior space 26 so the temple bar 105 rests on a top interior side 16a of the apex 16 (FIG. 2) and thus, the pair of sunglasses 100 is supported on the body 12. Further, the second temple bar 105 preferably is disposed over the intermediate bar 36 and secured over the body 12 so the temple bar 105 rests over the bar 36 and thus, the pair of sunglasses 100 is supported on the body 12. Simultaneously with supporting the sunglasses 100, and eyeglasses100, a ring 115 may be disposed on the intermediate bar 36 captured by the interior walls 28 and 30 so as to not be lost when the wearer's hands are occupied. Also a scarf generally shown as an object 100 may also be wrapped around the intermediate bar 36 (FIG. 7). At the conclusion of the wearer's task, the wearer W may remove the ring 115 from the intermediate bar 36 and replace the ring 115 around the finger of the wearer W. In this manner, advantageously a user may store multiple articles on the article carrier 10 at the same time and also wear the article carrier 10 as an attractive jewelry similar to a pendant or the like.

FIG. 10A shows an alternative embodiment of the article carrier 10 for a unisex male and female version, while the previously described version is preferably for a female. The article carrier 10 of FIG. 10A is substantially identical in operation and preferably includes an equilateral shaped figure and includes a distinct appearance, however various shapes are envisioned and FIG. 10A forms no limitations to the present disclosure. In yet a further alternative embodiment of the present disclosure, the article carrier 10 may be rendered without the bar 36.

Preferably, the instant article carrier 10 includes a pivoting bar 36 that opens as a "gate" to allow any lightweight article to be loaded and secured by it. Preferably, the member 36 acting as a gate opens, closes and locks the gate to ensure security and reliability. The intermediate bar 36 preferably stows the ring, but the bar 36 technically locks the article therein and is capable of carrying several articles at the same time. Various objects may be stored therein and the present article carrier 10 is not limited to jewelry and may encompass various other objects.

Figure 11:
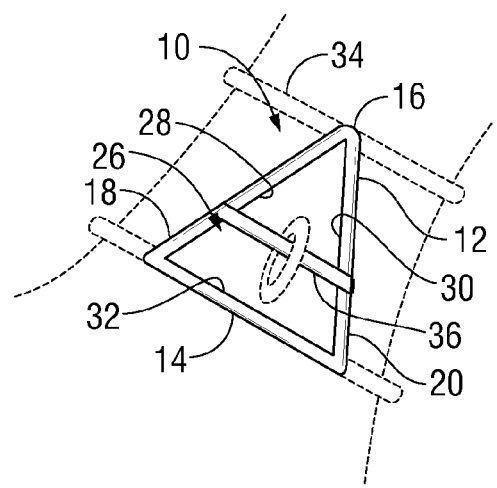
FIG. 11 shows another alternative embodiment of the present disclosure with the article carrier rendered as a bracelet.

Turning now to FIG. 11, there is shown another embodiment of the article carrier 10 rendered as a bracelet or an anklet that may surround a wrist of the wearer or an ankle of the wearer. The bracelet 10 preferably includes a chain portion, a cuff, a bangle, or rope 34 that surrounds the wrist or alternatively the ankle of the wearer. As can be seen again the bracelet 10 includes a first top side 14, and an arch 16 that is opposite the top side 14. The article carrier 10 also includes members 18 and 20 that converge to form the isosceles or equilateral triangular shaped body 12. As can be seen a ring 115 is inserted through interior space 26 and is disposed wrapped around the intermediate member 36 and is removably supported by the intermediate bar member 36 for storage while the user's hands are free on the bracelet 10. In this aspect, the intermediate member 36 may be moveable from between at least two positions to lock the ring 115 in place while the user wears the bracelet 10 or the anklet 10 on the wrist or the ankle Various configurations are possible and within the scope of the present disclosure.

Figure 12A:
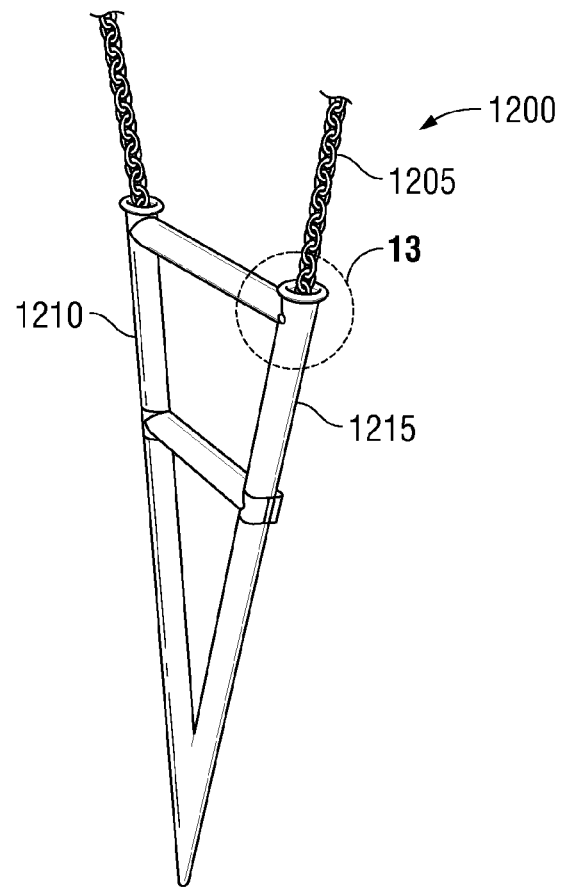
FIG. 12A illustrates an alternative embodiment of the article carrier.

FIG. 12A illustrates an article carrier 1200 that includes a chain 1205. As shown, the article carrier 1200 includes a first member 1210 and a second member 1215. The top of the first member 1210 and the top of the second member 1215 connects with the chain 1205. Chain 1205 may be made from precious or non-precious metals, such as gold, silver, platinum, stainless steel, titanium, brass, copper, or any other known in the art.

Figure 12B:
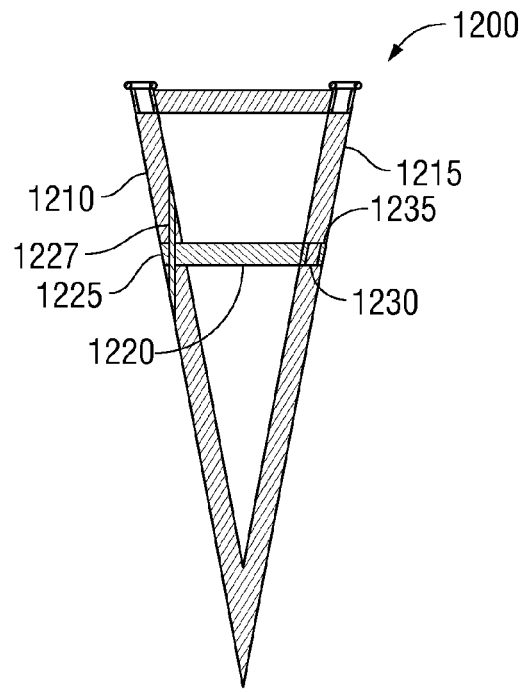
FIG. 12B illustrates a partial cross sectional view of the article carrier.

FIG. 12B illustrates a cross sectional view of the article carrier 1200. As shown, the first member 1210 and the second member 1215 form a triangular shape and an intermediate bar 1220 is connected to the first member 1210 by a hinge 1225. Disposed on an opposite side of the hinge 1225 is a reduced cross sectional portion 1230. A clasp 1235 on the intermediate bar 1220 mates with the reduced cross sectional portion 1230 as shown in FIG. 12B. FIG. 12B illustrates a clearance hinge 1227 on the first member 1210. Clearance hinge 1227 is a longitudinally shaped feature to assist the intermediate member 1220 to rotate as shown in FIG. 12C.

Figure 12C:
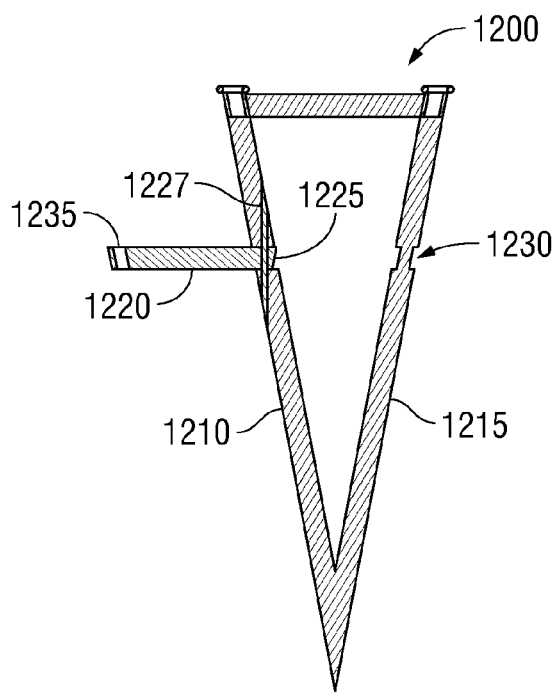
FIG. 12C illustrates a cross sectional view of the article carrier illustrating an intermediate bar and hinge.

FIG. 12C illustrates the intermediate portion 1220 in an opened position. Disposed on the first member 1210 is a hinge 1227 to provide clearance for the intermediate bar 1220 to rotate as shown. The intermediate bar 1220 preferably has the ability to rotate 360 degrees. In an important aspect, the longitudinally shaped hinge 1227 permits the bar to open to 360 degrees. Otherwise the intermediate bar 1220 would open to 120 degrees only. If the bar 1220 is shown straight, the bar 1220 will not open to 360 degrees. The bar 1220 preferably opens into a zigzag configuration in relation to the side of the body, or is offset slightly from the first member 1210. The intermediate bar 1220 may be triangular shaped, rectangular shaped, oval, circular, polygonal or any other shape known in the art. The first member 1210 may be circular, instead of triangular or any other shape known in the art.

Figure 13:
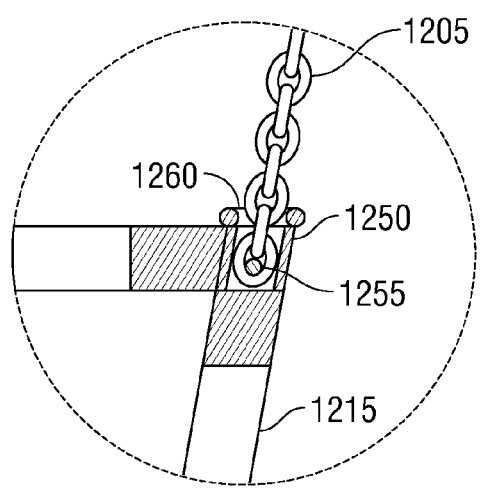
FIG. 13 illustrates a connector portion between an article carrier and a chain.

FIG. 13 illustrates an edge portion 1250 of the article carrier 1200. The edge portion 1250 illustrates the chain 1205 mating with a pin 1255 contained within a well 1260 formed in the second member 1215.

FIG. 14A illustrate the article carrier 1400 of an alternative embodiment. As shown, the article carrier 1400 includes a first member 1405 and a second member 1410 and an intermediate member 1415 and a leather 1420. The article carrier 1400 includes a leather 1420 and an edge portion 1425a and 1425b and pins 1425c and 1425d. The article carrier 1400 is shown as a men's design that has hinges specifically designed for leather 1420. The leather 1420 is connected via an adhesive that is glued inside a barrel end, and then the barrel end is connected to the article carrier 1400 with the edges 1425a and 1425b via the pins 1425c and 1425d. Preferably, the connector has a small space between the barrel and the edge portions 1425a and 1425b of the article carrier 1400.

The article carrier 1400 includes a hinge portion 1435. The hinge portion 1435 is disposed through the first member 1405. The hinge portion 1435 is disposed through an aperture that is located through the intermediate bar 1415 and the first member 1405. The hinge portion 1435 permits the intermediate bar 1415 to rotate three hundred and sixty degrees about the article carrier 1400.

FIG. 14B illustrates a cross sectional view of the article carrier 1400 in a cross sectional view. The article carrier 1400 includes an intermediate member 1415 that includes a clasp 1430. The first member 1405 includes a clearance notch associated with the hinge 1435 to permit the intermediate member 1415 to rotate. Disposed on the second member 1410 is a reduced cross sectional area 1440 to assist with mating with a clasp 1445 on the intermediate member 1415. FIG. 14C illustrates the article carrier 1400 with the intermediate member 1415 in an opened position. The intermediate bar 1415 preferably has the ability to rotate 360 degrees. In an important aspect, the longitudinally shaped notch forming the hinge1435 permits the bar to open to three hundred and sixty degrees. Otherwise the intermediate bar 1415 would open to 35 degrees only. The bar 1415 preferably opens into a zigzag configuration in relation to the side of the body, or is generally offset a slight amount relative to the first member 1405 to permit some clearance. Generally, the element zigzag means a shape of the offset of the intermediate bar 1415 relative to the first member 1405.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof.

Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize.

Changes can be made to the invention in light of the above Detailed Description. While the above description describes certain embodiments of the invention, and describes the best mode contemplated, no matter how detailed the above appears in text, the invention can be practiced in many ways. Details of the compensation system described above may vary considerably in its implementation details, while still being encompassed by the invention disclosed herein.

As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

While this invention has been particularly shown and described with references to a preferred embodiment thereof, it will be understood by those skilled in the art that is made therein without departing from the spirit and scope of the invention as defined by the following claims.

What is claimed is:

1. A wearable article carrier, the wearable article carrier comprising;
    a first member for receiving a first article; said first member having a hollow interior space disposed between a first lateral side and a second lateral side of said first member, each of said first and second lateral sides commencing from a top side of said first member and being interconnectable by a moveable second member,
    wherein said second member is an intermediate member disposed between the top side and the bottom of said first member and is connected to the first member, and moveable between a first position, in which the movable second member is connected to the first lateral side, and a second position in which the moveable second member is not connected to the first lateral side;
    wherein the moveable second member is configured to receive a second article on the moveable second member in the second position; and
    wherein the moveable second member is configured to retain the second article on the moveable second member in the first position.

2. The article carrier of claim 1, wherein the first member is generally triangular shaped and includes an arch, and
    wherein the second member includes a shape selected from the group consisting of a bar shaped member, square, triangular, rectangular, circular, elliptical, oval, a linear shaped member, and polygonal.

3. The article carrier of claim 2, wherein the first member has a bottom arch for retaining a pair of glasses.

4. The article carrier of claim 1, wherein the second member is configured to retain a pair of glasses.

5. The article carrier of claim 1, wherein the second moveable member is configured to retain a ring or a scarf on the second moveable member.

6. The article carrier of claim 1, wherein the first member is supported by a third member; said third member being configured for surrounding a neck of the wearer.

7. The article carrier of claim 1, wherein the first member is generally triangular shaped and has a hollowed out interior; and optionally wherein the second member extends across the triangular shaped member; and optionally wherein the second member is disposed between a top side and an arch; and optionally wherein the second member is configured to retain at least one of a scarf a ring and a pair of glasses; and, optionally wherein the second member comprises at least one of gold, silver, brass, platinum, copper, any precious, non-precious metals, gemstones, or a combination thereof; or optionally the first member being a resilient member; and optionally wherein the first member comprises at least one of gold, silver, brass, platinum, copper, or any precious or non-precious metal; and optionally wherein the first member comprises a longitudinal vertical axis about the first member measured from the top side to the arch, and wherein the first member is relative to the longitudinal axis.

8. The article carrier of claim 1, wherein the first member has a shape selected from the group consisting of triangular, circular, polygonal, irregularly shaped, oval, rectangular, square, or any combination thereof.

9. The article carrier of claim 1, wherein the first member comprises a triangular shaped member.

10. The article carrier of claim 1, wherein the first member comprises an isosceles shaped triangular member or an equilateral shaped triangular member.

11. The article carrier of claim 1, wherein the first member comprises a circular shaped member or an oval shaped member.

12. The article carrier of claim 1, wherein the first member comprises a rectangular member or a square shaped member.

13. The article carrier of claim 1, wherein the second member comprises a linear shaped member.

14. The article carrier of claim 1, further comprising a hinge connecting the second member to the first member, wherein the second lateral side of the first member has a longitudinal axis, and wherein the second member connects to the second lateral side of the first member at the hinge, and wherein a rotational axis of the hinge is inclined from the longitudinal axis of the second lateral side of the first member such that the second member is rotatable degrees about the rotational axis of the hinge and around the second lateral side.

15. The article carrier of claim 14, wherein the first member is an equilateral member or an isosceles triangular shaped member, and wherein the longitudinal axis is disposed through at least one leg of the triangular member.

16. The article carrier of claim 15, wherein the second member comprises a clasp on an opposite side of the hinge.

17. The article carrier of claim 16, wherein the first member comprises a clearance notch associated with the hinge to permit the second member to rotate.

18. The article carrier of claim 1, wherein the first member is configured to retain a pair of glasses; and wherein the movable second member is configured to retain a ring, scarf and/or a pair of glasses in the first position.

19. The article carrier of claim 1, wherein said second article comprises a finger ring, and wherein the moveable second member is an intermediate bar configured for receiving said finger ring placed around said intermediate bar in the second position and securely retaining the finger ring in the first position.

20. A bracelet comprising: a portion for encircling a wrist of a wearer;
  a first member connected to the portion, the first member including a top side and a first arch opposite said top side, the first member comprising a generally shaped triangular shaped member with a hollowed out interior space between a first lateral side and a second lateral side of said first member, each of said first and second lateral sides commencing from said top side of said first member and being interconnectable by a moveable horizontally disposed second member; wherein said moveable second member is an intermediate member disposed between the top side and the first arch and is connected to the first member, and moveable between a first position, where the movable second member is connected to the first lateral side of the first member, and a second position where the moveable second member is not connected to the first lateral side;
  wherein the moveable second member is configured to receive an article on the moveable second member in the second position; and
  wherein the moveable second member is configured to retain the article between at least said first and second lateral sides of the first member.

21. An article carrier for hanging from the neck of a wearer comprising;
  a first member configured to receive a first article;
  said first member having a hollow interior space disposed between a first lateral side and a second lateral side of said first member, each of said first and second lateral sides commencing from a top side of said first member and being interconnectable by a moveable second member,
  wherein said moveable second member is an intermediate member disposed between the top side and the bottom of said first member and is connected to the first member, and is moveable between a first position, in which the movable second member is connected to the first lateral side of the first member, and to a second position, in which the moveable second member is not connected to the first lateral side; and
  wherein the moveable second member is configured to receive a second article on the moveable second member in the second position and
  wherein the moveable second member is configured to retain the second article on the moveable second member in the first position.

* * * * *